United States Patent
Linde et al.

(10) Patent No.: US 7,720,507 B2
(45) Date of Patent: *May 18, 2010

(54) METHOD AND APPARATUS FOR CO-LOCATION OF TWO RADIO FREQUENCY DEVICES

(75) Inventors: Joakim Linde, Palo Alto, CA (US);
Aysegul Findikli, Palo Alto, CA (US);
Sven Jerlhagen, Cupertino, CA (US);
Ritesh Vishwakarma, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 11/976,182

(22) Filed: Oct. 22, 2007

(65) Prior Publication Data

US 2008/0056115 A1 Mar. 6, 2008
US 2009/0097388 A9 Apr. 16, 2009

Related U.S. Application Data

(63) Continuation of application No. 10/233,237, filed on Aug. 29, 2002, now Pat. No. 7,317,900.

(60) Provisional application No. 60/346,315, filed on Dec. 28, 2001.

(51) Int. Cl.
*H04M 1/00* (2006.01)
*H04B 7/00* (2006.01)

(52) U.S. Cl. .................. 455/553.1; 455/74.1; 455/41.2

(58) Field of Classification Search .............. 455/553.1, 455/552.1, 419, 272, 101, 129, 277.1, 283, 455/288, 432, 428, 435, 426, 550.1, 343.1, 455/343.2, 343.4, 74.1, 41.2, 445, 557, 114.2, 455/88, 84, 67.13, 63.1, 59, 526, 524, 525, 455/197.1, 73, 574; 370/503, 331, 329, 350, 370/504, 411, 500, 310, 201; 343/702
See application file for complete search history.

(56) References Cited

U.S. PATENT DOCUMENTS

| 6,014,561 | A | 1/2000 | Molne |
| 6,326,926 | B1 | 12/2001 | Shoobridge |
| 6,477,156 | B1 | 11/2002 | Ala-Laurila et al. |
| 6,509,877 | B2 | 1/2003 | Masaki |
| 6,560,443 | B1 | 5/2003 | Vaisanen et al. |
| 6,801,777 | B2 | 10/2004 | Rusch |
| 2001/0024953 | A1 | 9/2001 | Balogh |
| 2003/0043040 | A1 | 3/2003 | Zeps et al. |

*Primary Examiner*—Melody Mehrpour
(74) *Attorney, Agent, or Firm*—Sterne, Kessler, Goldstein & Fox P.L.L.C.

(57) ABSTRACT

A method for avoiding signal interference between a first RF device and a second RF device is provided. The first and second RF devices are co-located and the first RF device is configured to operate within a semi-stationary range of a frequency band. The second RF device is configured to operate by changing channels within the frequency band. The method initiates with a communication interface being provided between the first RF device and the second RF device. Then, the second RF device receives the semi-stationary range and a mode for the first RF device through the communication interface. Next, the second RF device is adapted to avoid the semi-stationary range of the frequency band of the first RF device when the mode of the first RF device is in an active mode. An apparatus where two RF devices are co-located without causing interference for each other is also provided.

20 Claims, 8 Drawing Sheets

METHOD AND APPARATUS FOR CO-LOCATION OF TWO RADIO FREQUENCY DEVICES

CROSS REFERENCE TO RELATED APPLICATION

This application is a continuation of U.S. Non-Provisional application Ser. No. 10/233,237, filed Aug. 29, 2002 which claims priority from U.S. Provisional Application No. 60/346,315, filed Dec. 28, 2001 and entitled "Co-Location of Two RF Devices", all of which are incorporated herein by reference in their entirety.

BACKGROUND OF THE INVENTION

The present invention relates generally to wireless communication between devices and more particularly to locating two radio frequency (RF) devices that share the same RF band in a common apparatus where the two co-located devices communicate with each other so that transmissions can occur simultaneously without substantial interference.

Bluetooth is a short range radio technology operating in the license-free Industrial, Scientific and Medical (ISM) frequency band between the frequencies of about 2400 Mega Hertz (MHz) to about 2483.5 MHz. As originally developed, Bluetooth was to replace cables which connect devices such as mobile phone handsets, headsets, and portable computers. The promise of the Bluetooth technology has since grown to enabling wireless communications between any electrical device. Thus, the notion of a wireless personal area network (WPAN) of a 10 meter connectivity bubble centered around the individual is developing.

At the same time, wireless local area networking (WLAN) is becoming accepted as a wireless Ethernet solution. The protocols for WLAN's, such as Institute of Electrical and Electronics Engineers (IEEE) 802.11b operate in the ISM frequency band as Bluetooth devices. A WLAN is an extension or replacement of wired networks for numerous computing devices. For example, a laptop that is WLAN enabled can connect to a particular network through an access point. Accordingly, WLAN technology is being embraced by businesses. With Bluetooth technology directed towards individuals and WLAN technology directed toward businesses, the two technologies are complementary. Therefore, a portable device, such as a portable computer, mobile phone, personal digital assistant (PDA), etc., may contain both a WLAN RF device and a Bluetooth RF device. As a result, the co-located RF devices must co-exist without interfering with each other.

FIG. 1 illustrates a schematic diagram of portable computer 100 containing Bluetooth RF device 102 and WLAN RF device 110 also known as Institute of Electrical and Electronics Engineers (IEEE) standard 802.11b. Bluetooth RF device 102 is in communication with antenna 104. A wireless communication pathway is established between Bluetooth RF device 102 and Bluetooth device 106 from antenna 104 to antenna 108. Bluetooth device 106 can be any number of electronic devices, such as a PDA, mobile phone, keyboard, mouse, speakers, etc. Portable computer 100 also includes 802.11b RF device for wireless access to a local area network (LAN). 802.11b RF device is in communication with antenna 112 and establishes a link with access point 114 through antenna 116. Access point 114 provides access to LAN 118 through an Ethernet connection.

The transmission technique used by the RF devices of FIG. 1 is a spread spectrum technique. Two spread spectrum modulation techniques are commonly used by devices transmitting in the ISM band. One of the modulation techniques, frequency-hopping spread spectrum (FHSS), is typically used by Bluetooth enabled devices. Under FHSS, a device can transmit high energy in a relatively narrow band for a limited time. The Bluetooth standard uses channels of 1 MHz in width at a hop rate of approximately 1600 times per second. There are 79 different channels used by the Bluetooth standard in the ISM frequency band. FHSS devices, such as Bluetooth enabled devices, are changing, i.e., hopping, channels according to a mapping algorithm following a different sequence depending on the link control state.

The second modulation technique, direct-sequence spread spectrum (DSSS), is typically used by IEEE 802.11b. Under the DSSS technique, a device occupies a wider bandwidth with relatively low energy in a given segment of the band. The DSSS technique does not hop, however, it may change frequency bands if an access point, through which a connection is made to a network, is changed. IEEE 802.11b uses a 22 MHz passband to transmit data. Thus, the 802.11b standard can utilize any of eleven 22 MHz subchannels across the ISM frequency band.

FIG. 2 illustrates a schematic diagram of the overlap between a DSSS passband and the Bluetooth time slots. Bluetooth is a time division multiplexed (TDM) system where the basic unit of operation is a dwell period of 625 microseconds ($\mu$s) duration during which transmission between Bluetooth devices occurs as represented by transmission slots 122. DSSS packet 124 is shown overlapping three transmission slots 122. Thus, if one of the co-located RF devices of FIG. 1 which uses the FHSS modulation technique hops to a channel that is overlapped by an active DSSS passband from the other co-located device, then the signals will collide. Hence, the interference caused by the collision will require the signals to be transmitted again, thereby degrading system performance. Furthermore, where a Bluetooth enabled RF device is co-located with a 802.11b RF device, the Bluetooth device is not capable of determining which frequencies in the ISM band that the 22 MHz sub channel of the 802.11b device occupies.

While attempts have been made to communicate the times to the Bluetooth device when the 802.11b device is actively transmitting, the system performance of the Bluetooth device is drastically reduced. Since the Bluetooth device has no knowledge of what frequency the 802.11b device is using, the Bluetooth device is blocked from the entire ISM frequency until the 802.11b device completes the transmission to avoid a collision. Thus, one attempt to avoid the collisions of co-located devices is to prevent the Bluetooth device from activity while the 802.11b device is active. In another attempt to address the problem, the Bluetooth device keeps track of which channels have interference through a table in memory recording good and bad transmissions and their frequencies. The Bluetooth device will avoid the channels where transmission is unsuccessful or has a high noise level based upon the past history as represented in the table. However, since the 802.11b device is not always transmitting, the Bluetooth device may not capture the frequency the 802.11b device transmits at. The Bluetooth device does not have the capability of actually determining which frequency the 802.11b device is occupying as it is "guessing". Therefore, when the Bluetooth RF device and the 802.11b RF device are co-located, that is, in the same apparatus, such as a portable computer, the potential for interference between them is high since the devices will be transmitting and receiving on the same frequencies from time to time. The interference caused from the collisions when the same frequencies are used will degrade performance for both RF devices. While the shortcomings for two co-located devices are described in terms of Bluetooth technology and 802.11b technology, they can be extended for any RF technologies co-located in the same device.

In view of the foregoing, there is a need for a method and apparatus that allows co-located RF devices to transmit and receive simultaneously without causing substantial interference with each other resulting in signal loss.

SUMMARY OF THE INVENTION

Broadly speaking, the present invention fills this need by providing a method and an apparatus for allowing one of the co-located radio frequency (RF) devices to communicate the RF range in which it operates so that the other RF device may avoid that range. The present invention also provides a method for the propagation of the frequency range to external RF devices.

In one embodiment of the present invention, a method for avoiding signal interference between a first RF device and a second RF device is provided. The first and second RF devices are co-located and the first RF device is configured to operate within a semi-stationary range of a frequency band. The second RF device is configured to operate by changing channels within the frequency band. The method initiates with a communication interface being provided between the first RF device and the second RF device. Then, the second RF device receives the semi-stationary range and a mode for the first RF device through the communication interface. Next, the second RF device is adapted to avoid the semi-stationary range of the frequency band of the first RF device when the mode of the first RF device is in an active mode.

In another embodiment of the invention, a method for avoiding signal interference between a first radio frequency (RF) device co-located with a second RF device is provided. The first RF device is configured to operate within a semi-stationary range of a frequency band. The second RF device is a slave to a third RF device. The method initiates with a communication interface being provided between the first RF device and the second RF device. Then, the semi-stationary range of the frequency band for the first RF device is received through the communication interface at the second RF device. Next, a propagation of the semi-stationary range through the second RF device to the third RF device is caused. The third RF device is adapted to avoid the semi-stationary range of the frequency band for the first RF device in response to the propagation.

In accordance with yet another aspect of the invention, an apparatus is provided. The apparatus includes a first radio frequency (RF) device, the first RF device is configured to operate within a defined range of a frequency band. A second RF device is co-located with the first RF device. The second RF device is configured to operate by changing channels within the frequency band. A communication interface is provided between the first RF device and the second RF device. The communication interface enables the second RF device to determine the defined range of the frequency band that the first RF device operates within and a mode of the first RF device. The second RF device avoids the defined range of the frequency band when the second RF device changes channels if the first RF device is in an active mode.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE INVENTION

Figure 1:
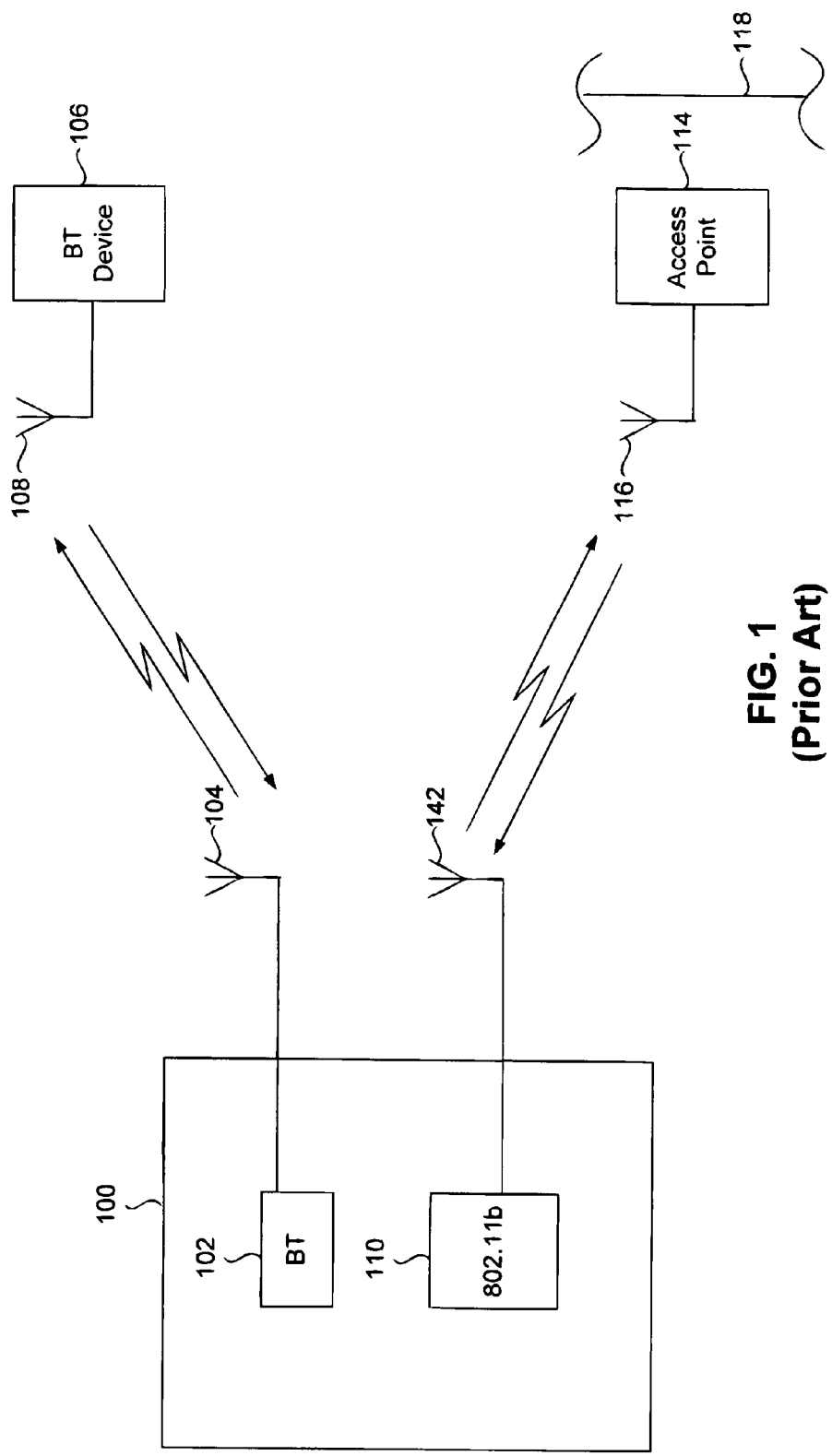
FIG. 1 illustrates a schematic diagram of a portable computer containing a Bluetooth radio frequency (RF) device and a wireless local area network (WLAN) RF device also known as Institute of Electrical and Electronics Engineers (IEEE) standard 802.11b RF device.
Figure 2:
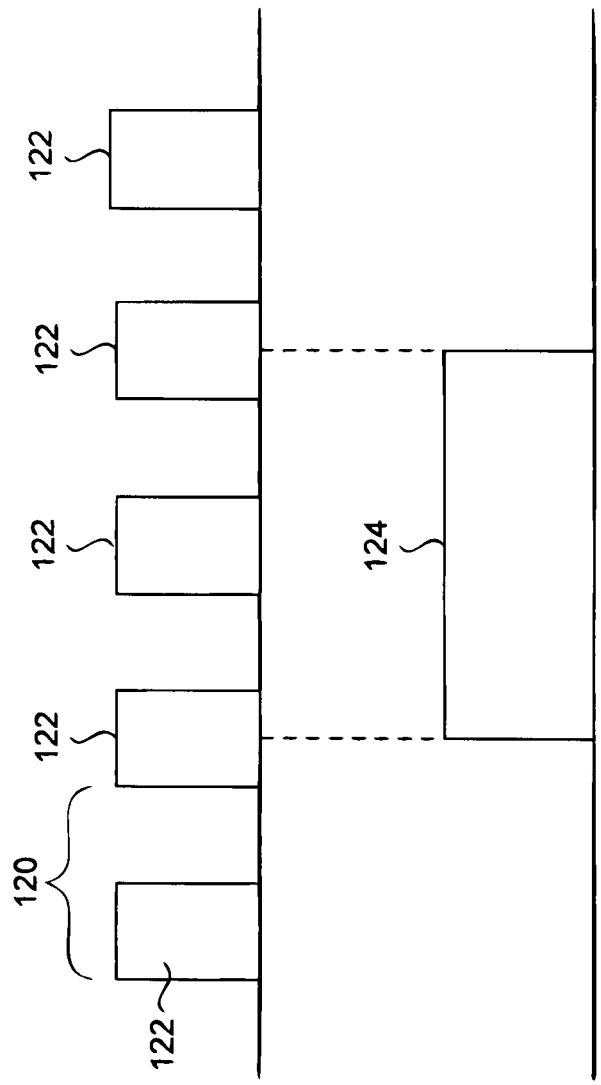
FIG. 2 illustrates a schematic diagram of the overlap between a DSSS passband and the Bluetooth time slots.

Several exemplary embodiments of the invention will now be described in detail with reference to the accompanying drawings. FIGS. 1 and 2 are discussed above in the "Background of the Invention" section.

The embodiments of the present invention separates, in time and frequency, two radio frequency (RF) signals from separate RF devices co-located in the same apparatus. As used herein, co-located refers to devices within the same apparatus. As will be explained in more detail below, the frequency that one RF device is using when the RF device is in an active mode, i.e., transmitting and receiving, is communicated to the other RF device. Thus, a master-slave relationship exists between the two co-located RF devices. For illustrative purposes, the embodiments below are discussed with respect to one RF device being an Institute of Electrical and Electronics Engineers (IEEE) 802.11b device and the other RF device being configured to execute the Bluetooth standard. However, it will be apparent to one skilled in the art that the methods and apparatus discussed herein are can be applied to other RF technologies, such as Ultrawideband, Zigbee, digital enhanced cordless telecommunications (DECT) and global positioning system (GPS).

Figure 3:
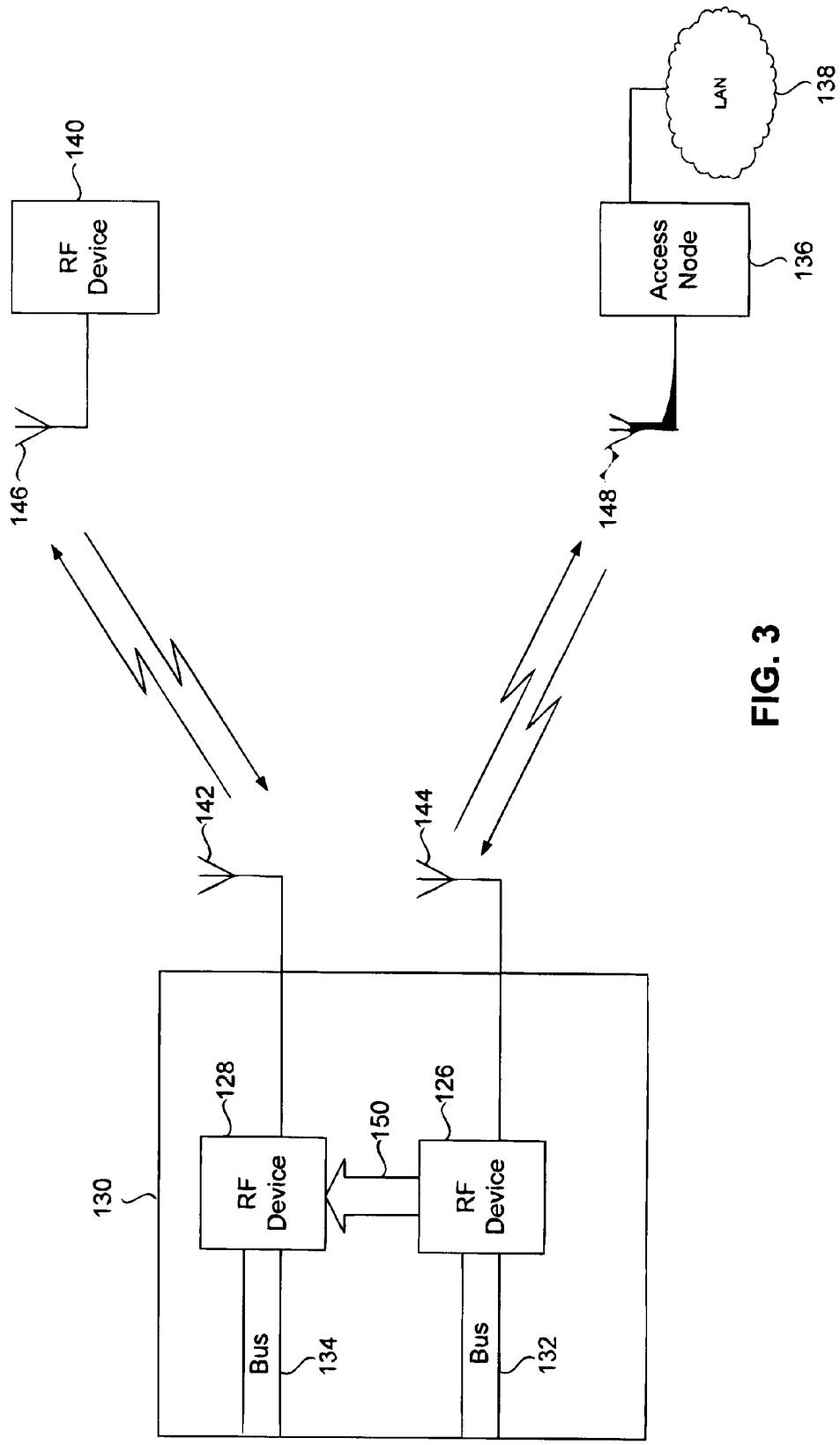
FIG. 3 is a schematic diagram of co-located RF devices configured to avoid signal interference in accordance with one embodiment of the invention.

FIG. 3 is a schematic diagram of co-located RF devices configured to avoid signal interference in accordance with one embodiment of the invention. RF device 126 and RF device 128 are co-located in apparatus 130. One skilled in the art will appreciate that RF devices 126 and 128 are in communication with a central processing unit (not shown) through buses 134 and 136, respectively. For example, where apparatus 130 is a portable computer, RF device 126 enables a wireless local area network (WLAN) connection through the 802.11b standard and RF device 128 is a Bluetooth enabled device in one embodiment of the invention. Thus, RF device 126 is configured to provide wireless Ethernet transmission to access node 136 of local area network (LAN) 138. RF device 126 is in communication with antenna 144, while access node 136 is in communication with antenna 148. As is well known, the antennas 144 and 148 transmit and receive the radio waves that RF device 126 and 148 use to communicate with each other. One skilled in the art will appreciate that the antennas can be any suitable antenna commercially available. Additionally, where RF device 126 executes the 802.11b standard, bus 132 is any bus capable of interfacing with RF device 126, such as a peripheral component micro channel interconnect architecture (PCMCIA) bus.

Still referring to FIG. 3, where RF device 128 is a Bluetooth enabled device, RF device 128 can communicate with an external Bluetooth enabled device such as RF device 140. It will be apparent to one skilled in the art, that Bluetooth enabled RF device 140 may be a mouse, keyboard, personal digital assistant (PDA), mobile phone, etc. which communicates with portable computer 130. Here, Bluetooth RF device 128 transmits short range RF through antenna 142 to another Bluetooth device 140, which receives the short range RF through antenna 146. Additionally, where RF device 128 is Bluetooth enabled, bus 134 is any bus capable of interfacing with RF device 128, such as a universal serial bus (USB).

RF device 126 and RF device 128 of FIG. 3 communicate with each other through communication interface 150 in one embodiment. Communication interface 150 is a physical bus such as a Philips I²C bus or an Intel System Management (SM) bus. It should be appreciated that RF device 126 and RF device 128 contain appropriate bus interfaces to enable communication between device 126 and 128. RF device 128 can request and receive the frequency that RF device 126 operates at through communication interface 150. Alternatively, RF device 126 and RF device 128 can communicate with each other through a common central processing unit (CPU) shared by the RF devices as described below with reference to FIG. 4. In addition to requesting and receiving the operating frequency of RF device 126, RF device 128 can request and receive a signal indicating whether RF device 126 is in an active mode through communication interface 150.

Figure 4:
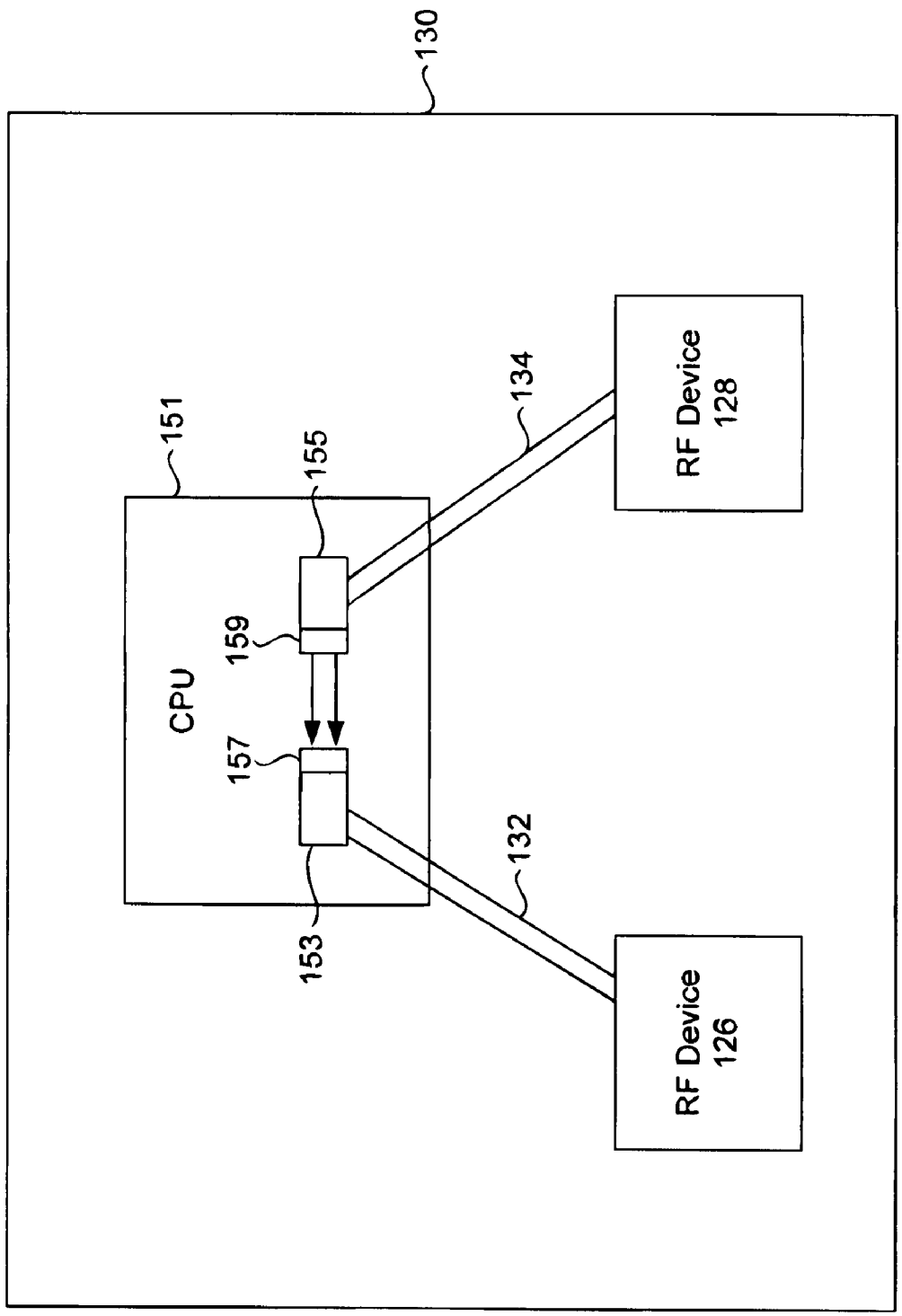
FIG. 4 is a schematic diagram of a communication interface between co-located RF devices in accordance with one embodiment of the invention.

FIG. 4 is a schematic diagram of a communication interface between co-located RF devices in accordance with one embodiment of the invention. RF device 126 and RF device 128 are co-located in apparatus 130. Continuing the example from above where apparatus 130 is a portable computer, RF devices 126 and 128 are in communication with CPU 151 through buses 132 and 134, respectively. Where RF device 126 is an IEEE 802.11b RF device, bus 132 can be any bus compatible with the IEEE 802.11b device and CPU 151, such as a PCMCIA bus, a USB bus, etc. Bus 132 interfaces with driver 153. It should be appreciated that bus 132 transports a signal to driver 153 from RF device 126 indicating the frequency at which the RF device is operating. In addition, a signal indicating that RF device 126 is in an active mode, i.e., transmitting or receiving, is also communicated to driver 153. Where RF device 128 is a Bluetooth enabled device, bus 134 is any bus compatible with the Bluetooth device and CPU 151, such as a PCMCIA bus, a USB bus, etc. Bus 134 interfaces with driver 155. Driver 155, which interfaces with bus 134, includes an application programming interface (API) 159 which is configured to communicate requests to API 157 of driver 153.

Still referring to FIG. 4, RF device 128 sends a request to the API of driver 155 for the frequency the 802.11b device is operating at. One skilled in the art will appreciate that this request is accomplished by driver 153 communicating with driver 155. In response to the request, a frequency range the RF device 126 is operating at is sent to driver 153 through bus 132. Additionally, a signal indicating that RF device 126 is in an active mode, i.e., transmitting or receiving, may also be transmitted to driver 153 through this pathway. Thus driver 155, through API 159 in communication with API 157 can access what frequency RF device 126 is operating at and when RF device 126 is active. As will be explained in more detail below, where RF device 126 is an 802.11b device, the frequency of operation for an 802.11b device is semi-stationary. That is, the 802.11b device operates within a defined range of the Industrial, Scientific and Medical (ISM) frequency band that does not change unless an access node is changed. Accordingly, RF device 128 can receive the information on the semi-stationary frequency range that RF device 126 is operating on so as to avoid the semi-stationary frequency range to eliminate interference generated from the co-located devices.

Figure 5:
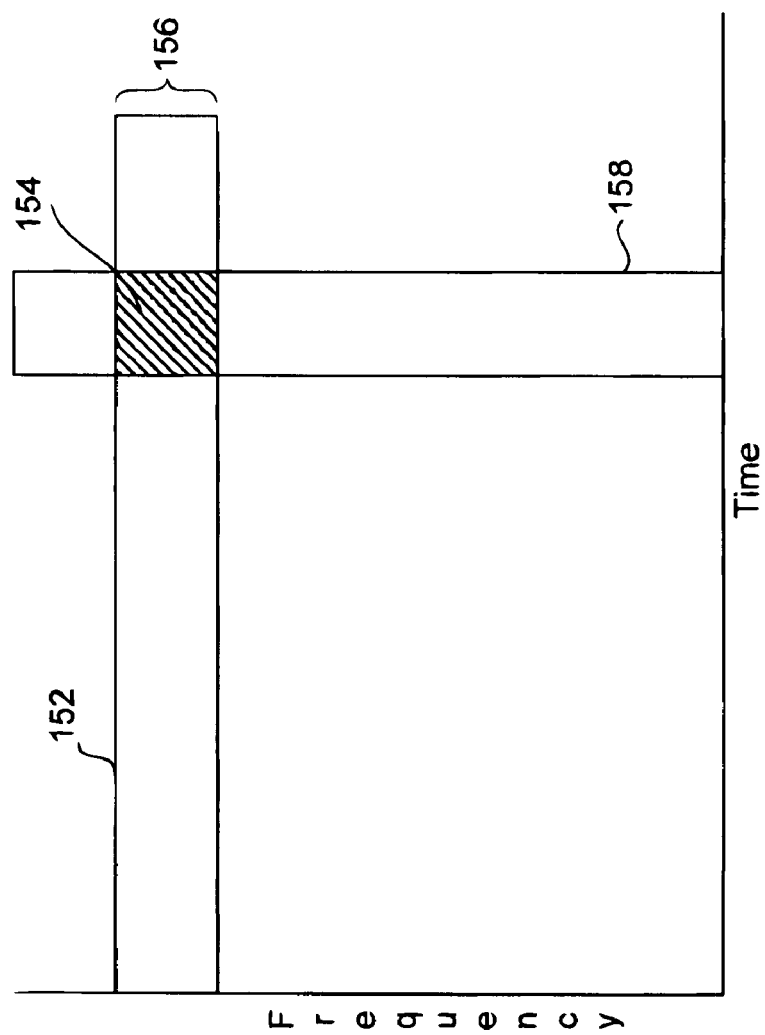
FIG. 5 is a graph of frequency and time parameters to illustrate the benefits of having the knowledge of both parameters so that interference from co-located RF devices is eliminated while the bandwidth of the co-located devices is substantially maintained.

FIG. 5 is a graph of frequency and time parameters to illustrate the benefits of having the knowledge of both parameters so that interference from co-located RF devices is eliminated while the bandwidth of the co-located devices is substantially maintained. The embodiment of an 802.11b RF chip co-located with a Bluetooth enabled chip will be used here for illustrative purposes. As is well known in the art, the 802.11b standard uses direct sequence spread spectrum (DSSS). A 22 MHz frequency band within the ISM frequency range is used to communicate with an access node. This frequency band is semi-stationary, i.e., the 802.11b uses this frequency for all communications as long as the communications are through the same access node. In other words, the semi-stationary frequency band will change if networks or access points are changed. On the other hand, the Bluetooth enabled device employs a frequency hop spread spectrum (FHSS). That is, the frequency used to transmit and receive between Bluetooth devices in the ISM frequency range is constantly changing or "hopping" between 79 different channels. The semi-stationary frequency band that the 802.11b device is operating in is represented by width 156 of bar 152. The time period that the 802.11b device is active is represented by bar 158. Thus, it should be appreciated that by only sending a signal to a co-located RF device, i.e., a Bluetooth device, indicating that the 802.11b device is active, will unnecessarily limit the bandwidth of the Bluetooth device. More specifically, the Bluetooth device does not transmit during the time that the 802.11b device is not active, since the Bluetooth device has no knowledge of the frequency of the semi-stationary band.

However, where the Bluetooth device is configured to receive the semi-stationary frequency band that the 802.11b device is operating in and the time period that the 802.11b device is active, as discussed with reference to FIG. 4, the bandwidth of the Bluetooth device is substantially maintained. The intersection of bar 152 and bar 158 represent the semi-stationary frequency band when the 802.11b device is active. Thus, the Bluetooth device can avoid the semi-stationary frequency when the 802.11b device is active, and while the 802.11b device is not active, the Bluetooth device is free to "hop" in the semi-stationary band without a performance penalty. In turn, the performance of the Bluetooth device is substantially maintained.

It should be appreciated that the master-slave relationship fits well with the properties of the 802.11b protocol and the Bluetooth standard. That is, since the 802.11b device is slower moving, i.e., semi-stationary, and does not utilize the entire ISM band at the same time it is well suited to act as the pace setter, i.e., the master. The fast hopping Bluetooth device which uses less bandwidth is well suited for the slave.

Bluetooth technology also employs a master-slave relationship which should not be confused with the master-slave concept described above. Where two Bluetooth devices, such as a portable computer and a PDA, are in communication with each other, the device initiating the communication acts as the master. Bluetooth masters set the frequency hopping sequence while Bluetooth slaves synchronize to the master in time and frequency. A Bluetooth master can support up to seven active Bluetooth slaves.

Figure 6:
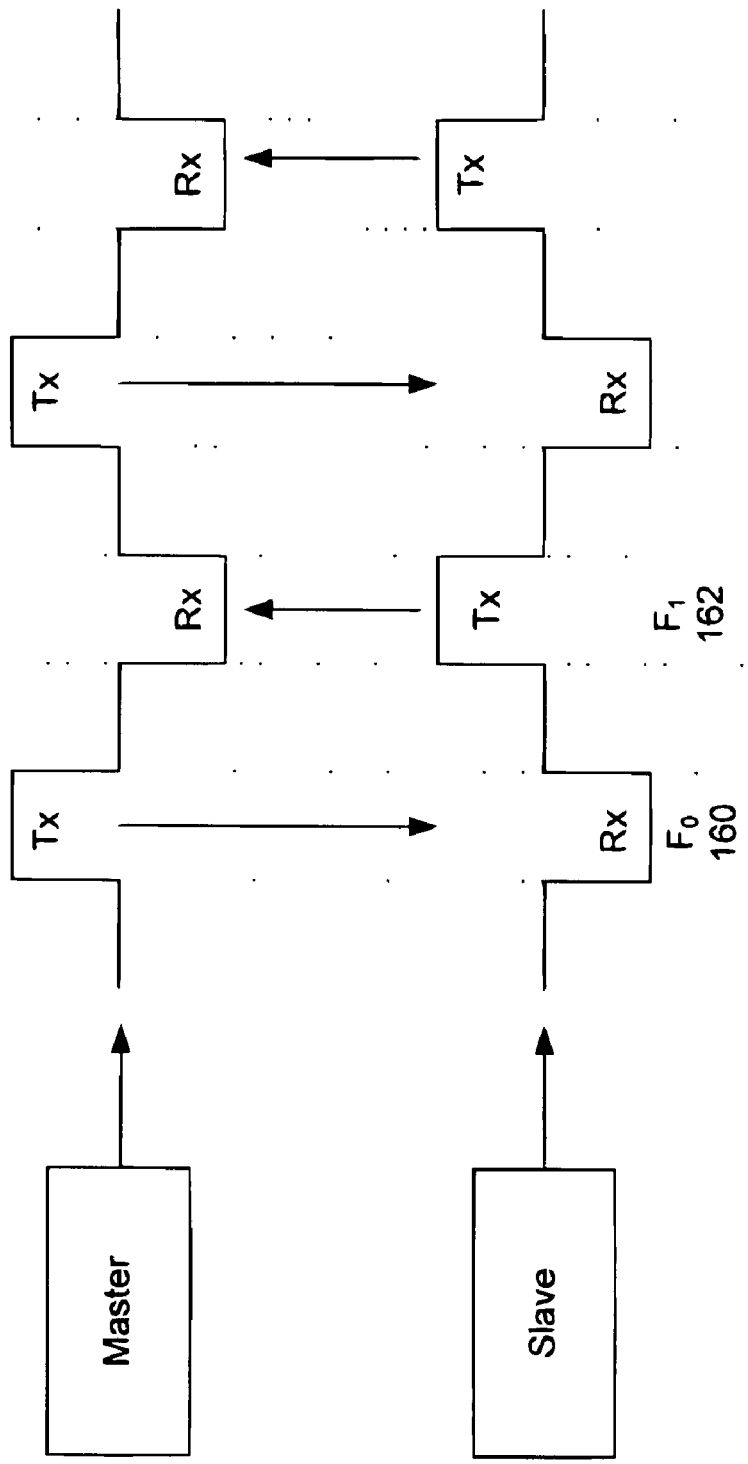
FIG. 6 is a diagram of the timing of transmitting and receiving between the Bluetooth master and the Bluetooth slave under the Bluetooth protocol.

FIG. 6 is a diagram of the timing of transmitting and receiving between the Bluetooth master and the Bluetooth slave under the Bluetooth protocol. At slot $f_0$ 160 the master first transmits to the slave. Here, both devices are tuned to a first radio channel. Next, the master and slave hop to the next channel, i.e., frequency, where at slot $f_1$ 162 the slave responds whether it understood the last transmission from the master and is allowed to transmit any requested data to the master. Thus, the Bluetooth protocol utilizes a polled scheme where the Bluetooth slave is not allowed to respond to the Bluetooth master until the Bluetooth slave is polled by the Bluetooth master. Moreover, the Bluetooth master controls when the Bluetooth slave responds as well as the frequency at which the response is sent.

Figure 7:
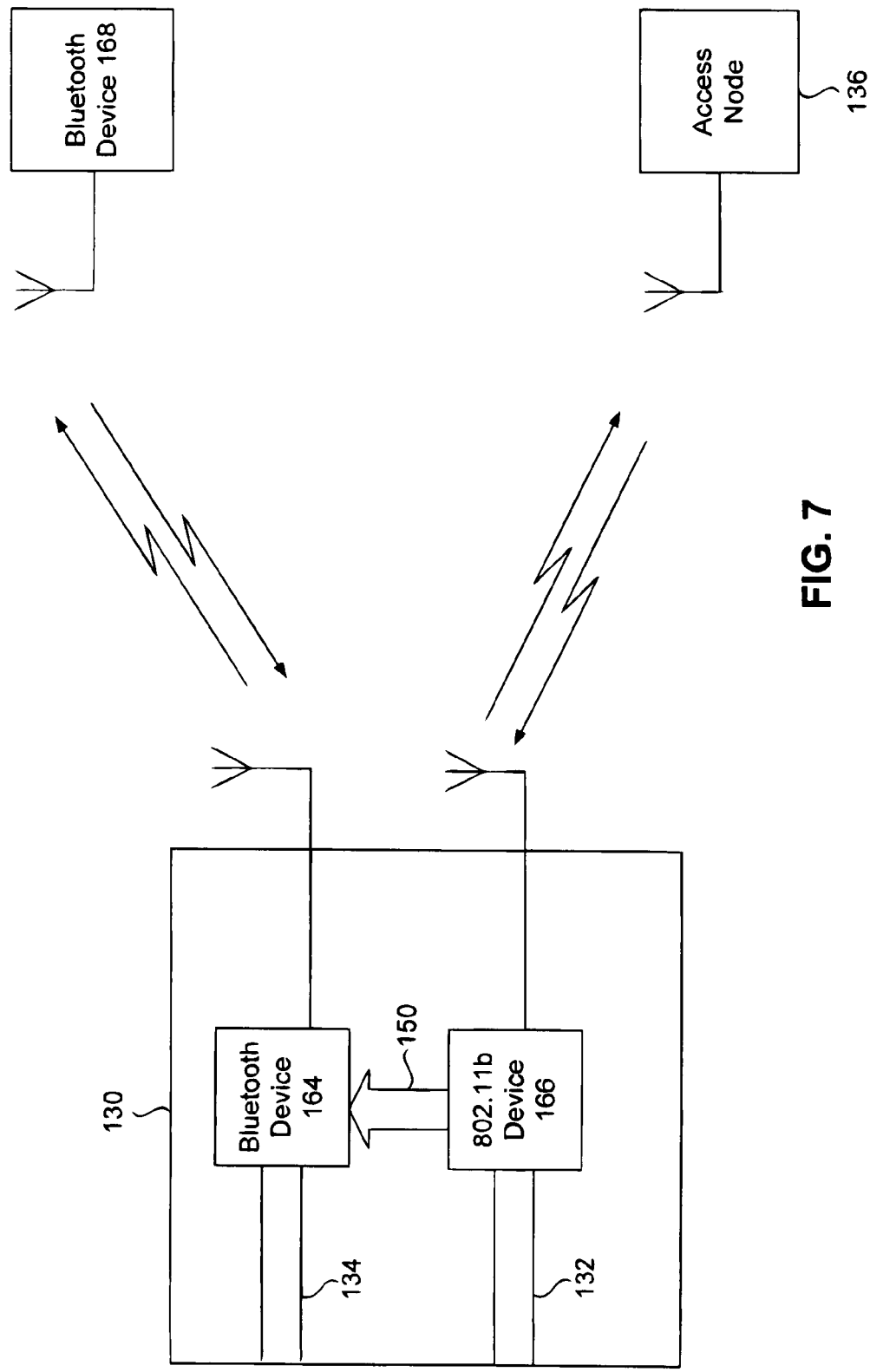
FIG. 7 is a schematic diagram of co-located Bluetooth and 802.11b RF devices in an apparatus where the Bluetooth device avoids the operating frequency of the 802.11b device and propagates the data to external Bluetooth devices in accordance with one embodiment of the invention.

FIG. 7 is a schematic diagram of co-located Bluetooth and 802.11b RF devices in an apparatus where the Bluetooth device avoids the operating frequency of the 802.11b device and propagates the data to external Bluetooth devices in accordance with one embodiment of the invention. Bluetooth device 164 receives the semi-stationary frequency band that 802.11b device 166 operates at and an active mode signal through communication interface 150. As described in reference to FIG. 4, Bluetooth device 164 may alternatively receive the frequency and active mode signal through a common CPU. Bluetooth device 164 is in communication with external Bluetooth device 168. For example, Bluetooth device 164 may be incorporated in a portable computer 130 while external Bluetooth device 168 may be any number of Bluetooth enabled devices, such as a PDA, mobile phone, speakers keyboard, a second portable computer, etc.

Still referring to FIG. 7, Bluetooth device 164 initiates communication with external Bluetooth device 168, therefore, Bluetooth device 164 is the master. It should be understood that at the same time Bluetooth device 164 is a slave to 802.11b device as described above. Thus, Bluetooth device 164 controls the frequency at which the slave responds and when the slave responds. The semi-stationary range that the 802.11b device operates at is thereby avoided in the frequency hopping of Bluetooth device 164. As Bluetooth device 168 transmissions are controlled as to frequency and time by Bluetooth device 164, Bluetooth device 168 also avoids the semi-stationary range that the 802.11b device operates at. It should be appreciated that while one Bluetooth slave is illustrated in FIG. 7, up to seven slaves can be supported by a Bluetooth master. Additionally, Bluetooth device 168 can be associated with another external Bluetooth enabled RF device.

Where external Bluetooth device 168 of FIG. 7 initiates communication with Bluetooth device 164, Bluetooth device 168 is the master. Here, the frequency data that 802.11b device operates at and the activity mode received by Bluetooth device 164 via communication interface 150 is propagated to external Bluetooth device 168. By propagating the data to Bluetooth device 168, which is the master of Bluetooth device 164, the frequency hopping algorithm for Bluetooth device 168 can be adjusted to avoid channels in the semi-stationary range used between 802.11b device and access node 136. If the 802.11b device should change networks, the new semi-stationary range is propagated to external Bluetooth device 168. One skilled in the art will appreciate that the Link Manager protocol of the Bluetooth protocol stack is used to communicate the frequency data and the activity mode received by Bluetooth device 164 to external Bluetooth device 168. A Link Manager protocol data unit (PDU) containing data indicating if certain channels can or can not be used is sent from device 164 to external device 168. This PDU is sent whenever the active signal changes state. In one embodiment, the PDU may be sent indicating a de-active signal.

Propagating the channel information described above is optional due to the performance impacts because of the restriction of what frequencies to use. The propagation increases the performance of a IEEE 802.11b link while reducing the bandwidth of the Bluetooth link when an 802.11b RF device and a Bluetooth RF device are co-located. Referring to FIG. 7, in one embodiment only Bluetooth device 164 is restricted from the 22 MHz semi-stationary frequency band that the 802.11b device operates at. Here, the bandwidth between Bluetooth device 164 and external Bluetooth device 168 is reduced by approximately 28% (22/79) times the duty cycle of the active signal. In another embodiment, both device 164 and external device 168 are restricted as to what frequency to use, with device 164 only restricted when the 802.11b device 166 is active. Therefore, device 164 must propagate the state of the active signal to external device 168. Here the bandwidth of the link between the Bluetooth devices is reduced by approximately 57% (22/79*2) times the duty cycle of the active signal. In yet another embodiment, external device 168 is restricted all of the time irrespective of the state of the active signal. Device 164 does not communicate the state of the active signal to external device 168 in this embodiment. The bandwidth between Bluetooth device 164 and external Bluetooth device 168 is reduced by approximately 28% (22/79) times the duty cycle of the active signal. It should be appreciated that the reduction in bandwidth described herein is applicable when co-located Bluetooth device 164 is a slave to external Bluetooth device 168.

Figure 8:
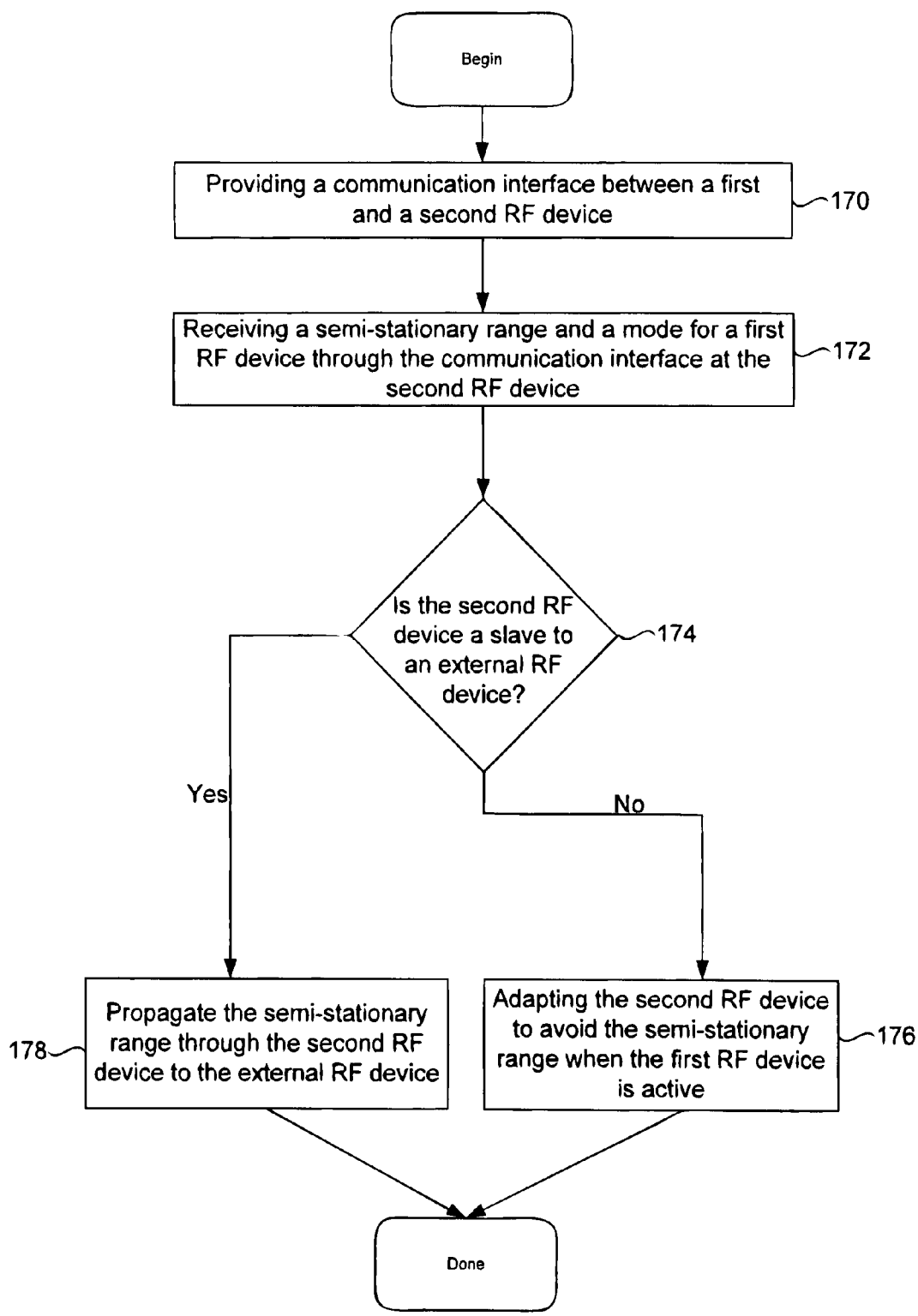
FIG. 8 is a flowchart diagram of the method operations performed between first and second co-located RF devices in accordance with one embodiment of the invention.

FIG. 8 is a flowchart diagram of the method operations performed between first and second co-located RF devices in accordance with one embodiment of the invention. Here, the first RF device is configured to operate within a semi-stationary range of a frequency band, such as an 802.11b device using a DSSS as described above with reference to FIGS. 3, 5 and 7. The second RF device is configured to operate by changing channels within the frequency band. In one embodiment, the frequency band is the ISM frequency band. The method initiates with operation 170 where a communication interface is provided between the first and second RF devices. The communication interface may be any suitable physical bus, such as a Philips I²C bus or an Intel SM bus, between the first and second RF device. Alternatively, the communication interface may be through a common CPU as described with respect to FIG. 4. The method then advances to operation 172 where the semi-stationary range and a mode for the first RF device is received through the communication interface at the second RF device. The semi-stationary range is the frequency band that the first RF device operates at and the mode is a signal indicating whether the first RF device active, i.e., is transmitting or receiving over the semi-stationary range. The communication interface enables the second RF device to receive the semi-stationary range and the mode for the first RF device. In one embodiment, the second RF device requests the information through the communication interface.

The flowchart diagram of FIG. 8 then moves to decision operation where it is determined if the second RF device is a slave to an external RF device. If the second RF device is not a slave to an external RF device, then the method proceeds to operation 176 where the second RF device is adapted to avoid the semi-stationary range when the first RF device is active. For example, the algorithm for determining the frequency hopping of a RF device employing FHSS is adjusted to avoid the semi-stationary range that the first RF device uses. Furthermore, the second RF device only needs to avoid the semi-stationary range when the first RF device is active. That is, when the mode indicates an active mode, the modified frequency hopping is implemented.

If the second RF device is a slave to an external RF device, then the method advances to operation 178 where the semi-stationary range is propagated through the second RF device to the external device. In the context of Bluetooth devices, where the second RF device is a Bluetooth slave to a third RF device, i.e., a Bluetooth master, the semi-stationary range must be propagated to the third RF device. Thus, the third RF device is adapted to avoid the semi-stationary range of the frequency band for the first RF device as described above.

In summary, the present invention provides a method and an apparatus for avoiding signal interference for co-located RF devices. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for avoiding signal interference between a first radio frequency (RF) device and a second RF device, comprising:
    providing a communication interface between the first RF device and the second RF device, where the first and second RF devices are co-located and contemporaneously active, the first RF device configured to execute a Zigbee protocol and to operate within a semi-stationary range of a frequency band, the second RF device configured to operate by changing channels within the frequency band;
    receiving the semi-stationary range and a mode for the first RF device through the communication interface at the second RF device; and
    adapting the second RF device to communicate using RF signals that fall outside the semi-stationary range of the frequency band of the first RF device when the first RF device is in an active mode.

2. The method of claim 1, further including:
    issuing a request from the second RF device for the semi-stationary range and the mode to the first RF device through the communication interface.

3. The method of claim 1, wherein the RF devices are co-located by placement of both RF devices within a single computer system.

4. The method of claim 1, wherein the communication interface is a physical bus between the first RF device and the second RF device.

5. The method of claim 1, wherein the communication interface includes a central processing unit common to the first RF device and the second RF device.

6. The method of claim 1, wherein the second RF device is configured to execute a Bluetooth protocol.

7. The method of claim 1, wherein the second RF device is configured to execute a 802.11b protocol.

8. A method for avoiding signal interference between a first radio frequency (RF) device co-located with a second RF device, comprising:
    providing a communication interface between the first RF device and the second RF device, wherein the first RF device is configured to execute a Zigbee protocol and to operate within a semi-stationary range of a frequency band, the second RF device being a slave to a third RF device;
    receiving the semi-stationary range of the frequency band for the first RF device through the communication interface at the second RF device; and
    causing a propagation of the semi-stationary range through the second RF device to the third RF device, wherein the third RF device is adapted to communicate using RF signals that fall outside the semi-stationary range of the frequency band for the first RF device in response to the propagation.

9. The method of claim 8, further including:
issuing a request from the second RF device for the semi-stationary range and the mode to the first RF device through the communication interface.

10. The method of claim 8, wherein the RF devices are co-located within a computer system.

11. The method of claim 8, wherein the communication interface is a physical bus between the first RF device and the second RF device.

12. The method of claim 8, wherein the communication interface includes a central processing unit common to the first RF device and the second RF device.

13. The method of claim 8, wherein the second RF device is configured to execute a Bluetooth protocol.

14. The method of claim 8, wherein the second RF device is configured to execute a 802.11b protocol.

15. An apparatus comprising:
a first radio frequency (RF) device configured to execute a Zigbee protocol and to operate within a defined range of a frequency band;
a second RF device co-located with the first RF device, the second RF device configured to operate by changing channels within the frequency band; and
a communication interface between the first RF device and the second RF device, the communication interface enabling the second RF device to determine the defined range of the frequency band that the first RF device operates within and a mode of the first RF device, wherein the second RF device is configured to communicate using RF signals that are outside the defined range of the frequency band when the second RF device changes channels if the first RF device is in an active mode.

16. The apparatus of claim 15, wherein the communication interface is a physical bus in direct communication with the first RF device and the second RF device.

17. The apparatus of claim 15, wherein the communication interface includes a central processing unit (CPU) shared by the first and the second RF devices, the first RF device being in communication with the CPU through a first bus, and the second RF device being in communication with the CPU through a second bus.

18. The apparatus of claim 15, wherein the second RF device is provided with the frequency band that the first RF device operates at in response to a request from a driver associated with the second RF device.

19. The apparatus of claim 15, wherein the second RF device is configured to execute a Bluetooth protocol.

20. The apparatus of claim 15, wherein the second RF device is configured to execute a 802.11b protocol.

* * * * *